United States Patent [19]

Schillinger et al.

[11] Patent Number: 4,591,518

[45] Date of Patent: May 27, 1986

[54] ACRYLIC FUNCTIONAL URETHANE ALKYD RESIN COATING COMPOSITIONS

[75] Inventors: William J. Schillinger, Glenshaw; J. Alden Erikson, Gibsonia; Rostyslaw Dowbenko, Gibsonia; Roger M. Christenson, Gibsonia, all of Pa.

[73] Assignee: PPG Industries, Inc., Pittsburgh, Pa.

[21] Appl. No.: 639,874

[22] Filed: Aug. 13, 1984

[51] Int. Cl.$^4$ .................. B05D 3/02; C08G 63/76; C08F 20/00

[52] U.S. Cl. .................. 427/385.5; 427/388.2; 427/388.5; 525/28; 525/32.1; 525/420.5; 525/440

[58] Field of Search .............. 525/28, 32.1, 420.5, 525/440; 427/385.5, 388.2, 388.5

[56] References Cited

U.S. PATENT DOCUMENTS

| | | | |
|---|---|---|---|
| 3,509,234 | 4/1970 | Burlant et al. | 260/859 |
| 3,664,861 | 5/1972 | Okamura et al. | 117/93.31 |
| 3,719,638 | 3/1973 | Huemmer et al. | 260/77.5 CR |
| 4,107,101 | 8/1978 | Kubens | 525/28 |
| 4,225,477 | 9/1980 | Vasishth et al. | 427/385.5 X |
| 4,267,239 | 5/1981 | Thankachan et al. | 427/385.5 X |
| 4,273,690 | 6/1981 | Walus | 260/22 CB |
| 4,321,169 | 3/1982 | Miller | 524/428 |
| 4,423,179 | 12/1983 | Guagliardo | 525/440 |

FOREIGN PATENT DOCUMENTS

| | | | |
|---|---|---|---|
| 1075399 | 7/1967 | United Kingdom | 525/28 |
| 1442511 | 7/1976 | United Kingdom . | |

*Primary Examiner*—Thurman K. Page
*Attorney, Agent, or Firm*—Barbara J. Park

[57] ABSTRACT

An air oxidizable coating composition is disclosed comprising an ungelled urethane modified alkyd resin containing pendant polymerizable unsaturated groups attached to the alkyd through urethane linkages. The ungelled urethane modified alkyd is the reaction product of components comprising a hydroxyl containing, air oxidizable alkyd resin having an oil length of between about 20 percent and about 70 percent and an isocyanate-functional ethylenically unsaturated compound. Also disclosed are a process for coating the substrate with the coating composition and certain ungelled urethane modified alkyd resins.

21 Claims, No Drawings

ACRYLIC FUNCTIONAL URETHANE ALKYD RESIN COATING COMPOSITIONS

BACKGROUND OF THE INVENTION

This invention relates to a coating composition containing certain ungelled urethane modified alkyd resins and a process for coating a substrate with the coating composition. Also disclosed are certain ungelled urethane modified alkyd resins.

Due to the high cost of imported energy and petroleum based raw materials as well as increased environmental awareness, the coatings industry has been attempting to lower the volatile organic content of its paints. This has forced a shift to higher solids coating systems. In order to reach the required goals while maintaining desirable application properties, it has been necessary to lower the viscosity of the vehicle system. This generally requires a concomitant reduction in the molecular weight of the major polymers of the composition. The industry has faced considerable difficulty with air drying alkyd resins in this regard. Lower molecular weight materials generally do not develop the same hardness and through-dry in thick films in the same amount of time compared to materials having a higher molecular weight. The present invention directs itself towards the production of materials which when oxidatively cured, develop properties comparable to, or better than, conventional lower solids systems.

SUMMARY OF THE INVENTION

Coating compositions herein described comprise ungelled urethane modified alkyd resins containing pendant polymerizable ethylenic unsaturation. The alkyd comprises the reaction product of a hydroxyl containing drying oil and/or drying oil fatty acid modified alkyd resin having an oil length of between about 20 percent and about 70 percent and an isocyanate-functional ethylenically unsaturated compound. When coated on a substrate, the coating compositions of the present invention typically provide faster dry time, improved hardness and better through dry in thick films than conventionally prepared materials of a similar molecular weight. These coating compositions are useful for coating metal substrates. Examples of such uses are railroad topcoat enamels and agricultural implement enamels. It is surprising that these coating compositions have faster through cure because polymerization of vinyl moieties is not normally expected at the ambient or elevated temperatures generally used for these types of materials in the absence of free radical initiators or ionizing radiation. Even modest amounts of acrylates give substantially improved through dry results.

DESCRIPTION OF THE PREFERRED EMBODIMENTS

Alkyd resins suitable for the invention are those air drying or air oxidizable alkyd resins which are generally known in the coatings field and which typically are prepared by one of the following three general methods:

(1) The alkyd resin is usually prepared by heating a polybasic acid and a polyfunctional alcohol with a polyol alcoholysis reaction product. The polyol alcoholysis reaction product is an oil, or an oil derivative, modified by ester interchange with a polyfunctional alcohol in order to form esters having an average hydroxyl functionality of two. The polyol alcoholysis reaction product contains hydroxyl groups. It is to be understood that the statistical occurrence of the various reaction products may include some constituents of the polyol reaction product which do not contain hydroxyl groups, but the mean product will contain hydroxyl groups. The oil is preferably selected from the group consisting of a drying oil, a semi-drying oil, a mixture thereof and a mixture of at least one of the drying oils or the semi-drying oils with a non-drying oil.

(2) The alkyd is sometimes prepared by first reacting a free fatty acid with a polyfunctional alcohol to form esters having an average hydroxyl functionality of two. These esters are then admixed with the polybasic acid and the polyfunctional alcohol and the mixture heated to form the alkyd resin.

(3) It is also possible to obtain the alkyd by incorporating the fatty acid and the polyfunctional alcohol with the polybasic acid and heating the mixture to reaction temperature.

Useful as the polyfunctional alcohol are polyhydric alcohols having 2 to 6 hydroxyl groups per molecule including dihydric alcohols such as ethylene glycol, 1,2-propylene glycol, 2,3-butylene glycol, 1,4-butanediol, 1,5-pentanediol and 2,2-bis(4-hydroxycyclohexyl) propane; trihydric alcohols such as glycerine, 1,1,1-trimethylolethane, 1,1,1-trimethylolpropane and 1,2,6-hexanetriol; tetrahydric alcohols such as erythritol, pentaerythritol and alpha-methyl glucoside; pentahydric and hexahydric alcohols such as tetramethylolcyclohexanol, dipentaerythritol, mannitol and sorbitol; polyallyl alcohol; and oxyalkylene adducts such as diethylene glycol, triethylene glycol and polyethylene glycol.

Useful as the polybasic acid or acid anhydride of the invention are polycarboxylic acids or anhydrides thereof. Examples of polycarboxylic acids include phthalic acid, isophthalic acid, terephthalic acid, tetrahydrophthalic acid, hexahydrophthalic acid, adipic acid, azelaic acid, glutaric acid, 3,3-diethylglutaric acid, malonic acid, pimelic acid, sebacic acid, suberic acid, succinic acid, 2,2-dimethylsuccinic acid, 2-methylsuccinic acid, dodecenylsuccinic acid, itaconic acid, fumaric acid, maleic acid, citraconic acid, diethyl maleic acid, and trimellitic acid. The anhydrides of the polybasic acids are also useful.

The higher polybasic acids having greater than 3 acid moieties or the higher polyfunctional alcohols should not, of course, be utilized in amounts which cause the alkyd resin to gel during preparation.

The oil or fatty acid which modifies the alkyd resins of use in the invention are defined below.

The oil used in the polyol alcoholysis reaction product is preferably selected from the group consisting of a drying oil, a semi-drying oil, a mixture thereof and a mixture of at least one of the drying oils or the semi-drying oils with a non-drying oil. Examples of the abovementioned oils include castor oil, dehydrated castor oil, coconut oil, cottonseed oil, fish oil, linseed oil, menhaden oil, oiticica oil, palm kernel oil, perilla oil, safflower oil, sardine oil, soybean oil and tung oil. The polyol alcoholysis reaction product may be an oil derivative modified by ester interchange with a polyfunctional alcohol.

The polyfunctional alcohol used to modify the oil is chosen from the same category, i.e. polyfunctional alcohol, as mentioned above and may be the same or different.

Examples of the free fatty acid include those derived from the oils by known processes such as fatty acids having 4 to 22 carbon atoms and characterized by a terminal carboxyl group, such as octanoic acid, decanoic acid, dodecanoic acid, hexadecanoic acid, octadecanoic acid, cis-9-octadecenoic acid, 12-hydroxy-cis-9-octadecenoic acid, cis-9, cis-12-octadecadienoic acid, cis-9, cis-12, cis-15-octadecatrienoic acid, cis-9, trans-11, trans-13-octadecatrienoic acid, 5,8,11,14-docosatetraenoic acid and cis-13-docosanoic acid.

An optional component of use in the three general methods is an aromatic monobasic acid.

The optionally used monocarboxylic acid is preferably an aromatic monocarboxylic acid, such as benzoic acid, para-tertiarybutylbenzoic acid, toluic acid and chlorobenzoic acid.

Other known modifications may be incorporated into the alkyd, such as by the reaction of epoxy functional esters such as the glycidyl ester of Versatic acid.

Useful hydroxyl containing air oxidizable alkyd resins are those having an oil length of from about 20 percent to about 70 percent. Typically, the oil or fatty acid used in the alkyd has an iodine value of greater than 100. The alkyd resin may be made by any known process.

The hydroxyl containing air oxidizable alkyd resin having an oil length from about 20 percent to about 70 percent is reacted with an isocyanate-functional ethylenically unsaturated compound to form the ungelled urethane modified alkyd resin of the invention. Preferably, the isocyanate-functional ethylenically unsaturated compound is present in said resin in an amount from about 1 to about 40 percent by weight of the solids of said alkyd.

The useful isocyanates are any known isocyanates which, when reacted with the hydroxyl containing air oxidizable alkyd resin having an oil length of between about 20 percent and about 70 percent forms an ungelled urethane modified alkyd resin having pendant polymerizable ethylenic unsaturation, preferably (meth-)acrylate unsaturation.

Useful as the isocyanate-functional ethylenically unsaturated compound are urethane-free isocyanate-functional ethylenically unsaturated compounds and isocyanate-functional ethylenically unsaturated compounds having one or more urethane groups.

Examples of urethane free isocyanate-functional compounds include isocyanatoalkyl (meth)acrylates such as isocyanatoethyl acrylate, isocyanatopropyl acrylate, isocyanatobutyl acrylate, isocyanatoethyl methacrylate, isocyanatopropyl methacrylate and isocyanatobutyl methacrylate; isocyanatoalkyl crotonates such as isocyanatobutyl crotonate; and isocyanate-functional monoalkenyl aromatic monomers such as alpha-methylstyrene-meta-isopropyl isocyanate and alpha-methylstyrene-para-isopropyl isocyanate. These isocyanates provide hydroxyl containing air oxidizable resins with pendant ethylenically unsaturated groups attached to the alkyd through urethane linkages.

Isocyanate-functional ethylenically unsaturated compounds having one or more urethane groups can be prepared by the reaction of isocyanates, particularly diisocyanates, with ethylenically unsaturated alcohols in appropriate molar amounts to provide a predominance of mono-isocyanate-functional ethylenically unsaturated compounds.

Examples of the preferred ethylenically unsaturated monohydric alcohols include acrylic functional monohydric alcohols such as (meth)acrylates, particularly hydroxyethyl acrylate, hydroxypropyl acrylate, hydroxybutyl acrylate, hydroxyethyl methacrylate, hydroxypropyl methacrylate and hydroxybutyl methacrylate; hydroxyalkyl crotonates such as hydroxybutyl crotonate; and allyl ethers of polyhydric alcohols such as trimethylolpropane diallyl ether, ethylene glycol monoallyl ether and pentaerythritol triallyl ether.

The isocyanates useful in the preparation of the isocyanate-functional ethylenically unsaturated compounds having one or more urethane groups of the invention are any known di- or polyisocyanates which, when reacted with the alcohol, forms an isocyanate-functional ethylenically unsaturated compound which has a predominance of monoisocyanate functionality. Examples of the isocyanates include polyisocyanates and diisocyanates known in the art such as diphenylmethane diisocyanate, 1,6-hexamethylene diisocyanate and 3,5-toluene diisocyanate. Preferred di- and polyisocyanates have differing reactivity caused, for example, by steric hindrance. Examples of the preferred isocyanates include 2,4-toluene diisocyanate; mixtures of toluene diisocyanates having a majority of the species having differing activity, such as 80 percent 2,4-toluene diisocyanate and 20 percent 2,6-toluene diisocyanate by weight; and the more preferred isophorone diisocyanate.

The temperatures used in the preparation of the isocyanate-functional ethylenically unsaturated compounds having one or more urethane groups depends upon the specific reactants. The reaction of toluene diisocyanate and hydroxyethyl methacrylate generally takes place between 0° C. and 120° C., preferably between 20° C. and 90° C., and more preferably, about 25° C. Other reaction products are prepared according to the procedures known in the art.

The ethylenically unsaturated alcohols and the isocyanates used to prepare urethane group containing isocyanate-functional ethylenically unsaturated compounds provide a ratio of equivalents of alcohol to equivalents of isocyanate of from 0.8:2.0 to 1.2:2.0, preferably from 1.0:2.0 to 1.05:2.0.

The molar ratio of the preferred ethylenically unsaturated alcohols to the preferred diisocyanates is from 0.8:1.0 to 1.2:1.0, preferably from 1.0:1.0 to 1.05:1.0.

The alkyd resin and the isocyanate-functional ethylenically unsaturated compound are preferably reacted together below 100° C. Above this temperature, in the absence of a suitable inhibitor, the preferred isocyanate-functional unsaturated compound may polymerize with itself or other unsaturation in the alkyd. The reaction is typically carried out at about 65° C., optionally in the presence of an inhibitor and optionally in the presence of a catalyst. The inhibitor, such as 2,6-ditertiarybutyl-p-cresol (e.g. IONOL from Shell Oil Co.) may be added to retard or prevent addition polymerization. The catalyst is used to promote reaction speed. An example of the catalyst is dibutyltin dilaurate.

A coating composition is prepared from the ungelled urethane modified alkyd containing pendant polymerizable ethylenic unsaturation. In addition to the above component, the compositions contain other optional ingredients including driers ordinarily utilized in coatings of this general class, ultraviolet absorbers, pigments and inhibitors which are known in the art. The above ingredients are present in a preferred embodiment. In addition, various fillers, plasticizers, flow control agents, surfactants and other known formulating additives may be used. Also useful in the coating compositions of the invention is an aluminum or titanium chelating crosslinker such as ALUSEC 510 ethyl acetoacetato-di-2-ethoxy ethoxy aluminum manufactured by Manchem Ltd. or TYZOR® TPT tetraisopropyl titanate manufactured by DuPont Corporation. An antiskin agent such as methyl ethyl ketoxime is often added to improve package stability.

The coating composition is applied to a substrate and cured. The curing process occurs under ambient or elevated temperature conditions. Ambient or elevated temperature conditions are those conditions generally considered to be "air dry" or "force dry" conditions. Generally, the coated substrates are cured at 13° C. to 250° C., preferably 20° C. to 150° C. and, more preferably, 50° to 90° C. oven temperature. The temperature of the coated substrate is preferably above 20° C. and below about 55° C. upon application.

The curing process is carried out in a substantially ionizing radiation-free environment. Natural radiation, which occurs from sunlight, background radiation and other sources is not excluded from the curing process, but the use of radiation cure, as known in the industry, is excluded from the curing process.

While not intending to be legally bound hereby, it is postulated that the pendant ethylenic unsaturation in the presence of hydroperoxides formed during the drying process may explain the quickness of through-dry, which is an advantage of the present invention.

The following examples will further illustrate the invention. Where not otherwise specified, throughout this specification and claims, temperatures are in degrees Centigrade and parts, percentages and proportions are by weight.

EXAMPLE I

An ungelled urethane modified alkyd resin containing pendant polymerizable ethylenic unsaturation of the invention was prepared from a hydroxyl containing air oxidizable alkyd resin and an isocyanate-functional urethane-free unsaturated compound as follows:

The hydroxyl containing air oxidizable alkyl resin was made using known procedures from the following materials:

| Ingredients | Parts |
|---|---|
| Soya oil | 247.8 |
| Pentaerythritol | 65.4 |
| Litharge | 0.0791 |
| Paratertiarybutylbenzoic acid | 24.9 |
| Phthalic anhydride | 112.0 |
| Cardura E[1] | 35.6 |
| Xylenes | 119.2 |

[1] A product of Shell Chemical Corporation which is a glycidyl ester of Versatic acid.

The product had an hydroxyl number of 52.8 mg KOH/g resin.

To a three liter, 4 neck reaction vessel equipped with condenser, stirrer and nitrogen sparge were charged the following materials:

| Ingredients | Parts |
|---|---|
| Alkyd resin above | 300 |
| Dibutyltin dilaurate | 0.85 |

The reaction vessel was flushed with nitrogen and stirred. To the reaction vessel was charged the following material:

| Ingredients | Parts |
|---|---|
| Isocyanatoethyl methacrylate | 7.44 |

The reaction vessel was heated to 65° C. and held at that temperature until an IR analysis showed no unreacted isocyanate. Heating was thereafter discontinued. The product had 84.4 percent solids, a Gardner Holdt viscosity of Z2+, color of 6, acid value of 0.85 mg KOH/g resin and a density of 1.03 g/ml.

EXAMPLE II

Another ungelled urethane modified alkyd resin containing pendant polymerizable ethylenic unsaturation of the invention was prepared as follows:

A

An isocyanate-functional acrylate monomer having one or more urethane groups was prepared under a nitrogen/air blanket from the following materials:

| Ingredients | Parts |
|---|---|
| Reactor Charge | |
| Isophorone diisocyanate (IPDI) | 254.0 |
| Methyl isobutyl ketone (urethane grade MIBK) | 86.4 |
| Dibutyltin dilaurate | 0.2288 |
| Charge No. 2 | |
| MIBK | 3.000 |
| 4-methyl-2,6-ditertiary-butylphenol | 0.20 |
| Charge No. 3 | |
| Hydroxyethyl methacrylate (HEMA) | 156.2 |
| Charge No. 4 | |
| MIBK | 25 |

The ingredients of the reactor charge and Charge No. 2 were fed to a reaction kettle under air sparge and nitrogen blanket at a 1:1 ratio and heated to 38° C. The heat was turned off and Charge No. 3 was fed to the reactor vessel over a time period of 60 minutes during which the exothermic reaction temperature was controlled at between 60° C. and 65° C. Charge No. 4 was then fed as a rinse and the reaction vessel was held at 60° C. to 65° C. to a stalled isocyanate value of between 470 and 520. The temperature was then reduced below 35° C. The HEMA-IPDI ester had a solids content at 105° C., run 2 hours, of 72.8 percent solids, a viscosity of A, acid number 3.81 mg KOH/g resin, an analyzed isocyanate equivalent of 477 and a density of 1.03 g/ml.

B

The ungelled urethane modified alkyd resin of the invention was then prepared from a hydroxyl containing air oxidizable resin and the isocyanate-functional ethylenically unsaturated compound having one or more urethane groups from the following materials:

| Ingredients | Parts |
|---|---|
| Soya oil | 249.0 |
| Pentaerythritol | 71.7 |

| Ingredients | Parts |
| --- | --- |
| Litharge | 0.077 |
| Phthalic anhydride | 116.6 |
| Benzoic acid | 31.1 |
| Cardura E | 9.9 |
| HEMA-IPDI ester above | 55.3 |
| Dibutyltin dilaurate | 1.76 |
| Methyl ethyl ketoxime | 0.18 |
| Xylenes | 113.0 |

The hydroxyl containing air oxidizable alkyd was first prepared and then the HEMA-IPDI ester was reacted with it by the general procedure of Example I to produce an ungelled urethane modified alkyd resin of the invention having 80.3 percent solids, a Gardner Holdt viscosity of Z5-, a color of 5, density of 1.04 g/ml, acid value of 1.2 mg KOH/g resin and hydroxyl value of 21.4 mg KOH/g resin.

C

A coating composition was prepared using the following:

| Ingredients | Parts |
| --- | --- |
| Resin of Part II B | 142.17 |
| Xylenes | 24.01 |
| Methyl ethyl ketoxime | 0.64 |
| Ethanol | 12.5 |
| Cobalt Drier[1] | 0.96 |
| Manganese Drier[2] | 1.42 |
| ALUSEC Aluminum crosslinking agent | 10.67 |
| Paste[3] (13.43 parts resin solids 31.97 parts pigment solids) | 57.63 |

[1]CEM-all from Mooney Chemical Company, containing 12% cobalt.
[2]NUXTRA from Tenneco Corporation, containing 9% manganese.
[3]Made from organic red, molybdenum orange and Kroma red pigment in xylene.

The coating composition had a solids content of 80.6% and had a No. 4 Ford cup viscosity of 70 seconds.

The coating composition was applied to test surfaces and dried under various conditions to determine its drying properties. A 90 minute air dry test was performed to establish the maximum thickness at which the coating was print-free after the coating was air dried for 90 minutes (90 min. air dry). The term "print-free" refers to a condition wherein a pressure of approximately six pounds applied to the coating by the thumb in a rotary manner will not leave an imprint on the coating.

A 5 hour air dry test was performed to establish the maximum thickness at which the coating was print-free after the coating was air dried for 5 hours (5 hour air dry).

A 65° C., 20 minute force bake test was performed to establish the maximum thickness at which the coating was print-free after the coating was forced dried for 20 minutes at 65° C. and allowed to cool for 5 minutes after being removed from the oven (20 min./65° C./5 min.).

Finally, a spot test was performed. The coating was force dried for 20 minutes at 65° C. and air dried for five hours to a dry film thickness of 1.5 mil (0.038 mm). One milliliter of deionized water was applied to the surface of the coating and was allowed to evaporate overnight. The coating was then observed to note any marking left by the evaporated water. The results of the tests are shown below:

| Test | Results |
| --- | --- |
| 90 min. air dry | 1.2 mil (.030 mm) |
| 5 hr. air dry | 4.1 mil (.104 mm) |
| 20 min./65° C./ 5 min. | 1.7 mil (.043 mm) |
| Water Spot | Barely noticeable ring |

COMPARATIVE EXAMPLE A

In order to show the advantage of ethylenic unsaturation, tests were performed using the base alkyd of Example II B except that the HEMA-IPDI ester of Example II A was replaced with a molar equivalent of phenyl isocyanate. The coating composition had a solids content of 79.3% by weight and had a No. 4 Ford cup viscosity of 64 seconds. Test panels were coated with the phenyl isocyanate-modified alkyd-based coating composition and subjected to the tests enumerated in Example II C. The results, set forth below illustrate that the films did not cure to the thicknesses which were achieved with the films made according to the invention in Example II:

| Test | Results |
| --- | --- |
| 90 min air dry | 1.0 mil (.025 mm) |
| 5 hr. air dry | 2.4 mil (.061 mm) |
| 20 min./65° C./5 min. | 1.3 mil (.033 mm) |
| Water spot | Very, very noticeable ring |

We claim:

1. A process for coating a substrate with a coating composition comprising the steps of:
   (a) applying to a substrate a coating composition containing an ungelled urethane modified alkyd resin containing pendant polymerizable ethylenically unsaturated groups attached to the alkyd resin through urethane linkages, said ungelled urethane-modified alkyd resin being the reaction product of a hydroxyl containing, air oxidizable alkyd resin having an oil length of from about 20 to about 70 percent and an isocyanate-functional ethylenically unsaturated compound and,
   (b) curing the coating composition on the coated substrate under ambient or elevated temperature.

2. The process of claim 1 wherein said hydroxyl containing air oxidizable alkyd resin is formed from an oil having an iodine value of greater than 100.

3. The process of claim 1 wherein said hydroxyl containing, air oxidizable alkyd resin is formed from a fatty acid having an iodine value of greater than 100.

4. The process of claim 1 wherein said isocyanate-functional ethylenically unsaturated compound is urethane-free.

5. The process of claim 1 wherein said pendant polymerizable ethylenically unsaturated groups are selected from the group consisting of acrylates and methacrylates.

6. An air oxidizable coating composition comprising an ungelled urethane modified alkyd resin containing pendant polymerizable unsaturated groups attached to the alkyd resin through urethane linkages, said ungelled urethane modified alkyd being the reaction product of components comprising a hydroxyl containing, air oxidizable alkyd resin having an oil length of between about 20 percent and about 70 percent and an isocyanate-functional ethylenically unsaturated compound.

7. The coating composition of claim 6 wherein said hydroxyl containing, air oxidizable alkyd resin is formed from an oil having an iodine value of greater than 100.

8. The coating composition of claim 6 wherein the isocyanate functional compound is a reaction product of components comprising hydroxypropyl methacrylate and toluene diisocyanate.

9. The coating composition of claim 6 wherein said isocyanate-functional ethylenically unsaturated compound is urethane-free.

10. The coating composition of claim 9 wherein said urethane-free isocyanate-functional ethylenically unsaturated compound is isocyanatoethyl methacrylate.

11. The coating composition of claim 6 wherein said isocyanate-functional ethylenically unsaturated compound is present in said ungelled urethane modified alkyd resin in an amount from about 1 to 40 percent by weight of the solids of said alkyd.

12. The coating composition of claim 6 wherein said pendant polymerizable ethylenically unsaturated groups are selected from the group consisting of acrylates and methacrylates.

13. The coating composition of claim 6 further comprising a component selected from the group consisting of a crosslinker, a drier, a pigment, a stabilizing agent, an inhibitor and combinations thereof.

14. The coating composition of claim 13 comprising the stabilizing agent methyl ethyl ketoxime.

15. The coating composition of claim 13 in which said crosslinker is selected from the group consisting of aluminum and titanium-based chelating crosslinkers.

16. The coating composition of claim 6 wherein the isocyanate-functional compound is a reaction product of components comprising hydroxyethyl methacrylate and isophorone diisocyanate.

17. The coating composition of claim 6 wherein the isocyanate-functional compound is a reaction product of components comprising trimethylolpropane diallyl ether and isophorone diisocyanate.

18. An ungelled urethane modified alkyd resin containing pendant polymerizable ethylenically unsaturated groups attached to the alkyd resin through urethane linkages which is the reaction product of components comprising:
  (a) a hydroxyl containing, air oxidizable alkyd resin having an oil length of between about 20 percent and about 70 percent; and
  (b) an isocyanate-functional urethane free ethylenically unsaturated compound.

19. The ungelled urethane modified alkyd resin of claim 19 wherein said hydroxyl containing, air oxidizable alkyd resin is formed from an oil having an iodine value of greater than 100.

20. The ungelled urethane modified alkyd resin of claim 19 wherein said hydroxyl containing, air oxidizable alkyd resin is formed from a fatty acid having an iodine value of greater than 100.

21. The ungelled urethane modified alkyd resin of claim 19 wherein said pendant polymerizable ethylenically unsaturated groups are selected from the group consisting of acrylates and methacrylates.

* * * * *

UNITED STATES PATENT AND TRADEMARK OFFICE
CERTIFICATE OF CORRECTION

PATENT NO. : 4,591,518
DATED : May 27, 1986
INVENTOR(S) : William J. Schillinger, Rostylaw Dowbenko, J. Alden Erikson and Roger M. Christenson It is certified that error appears in the above-identified patent and that said Letters Patent are hereby corrected as shown below:

Column 10, Claim 19, line 23; "19" should read --18--.

Column 10, Claim 20, line 27; "19" should read --18--.

Column 10, Claim 21, line 31; "19" should read --18--.

Signed and Sealed this

Twenty-third Day of September 1986

[SEAL]

Attest:

DONALD J. QUIGG

Attesting Officer

Commissioner of Patents and Trademarks